(12) United States Patent  
Sakakibara

(10) Patent No.: US 9,065,353 B2  
(45) Date of Patent: Jun. 23, 2015

(54) DIRECT AC POWER CONVERTING APPARATUS

(75) Inventor: Kenichi Sakakibara, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 1721 days.

(21) Appl. No.: 12/298,060

(22) PCT Filed: Apr. 20, 2007

(86) PCT No.: PCT/JP2007/058630  
§ 371 (c)(1),  
(2), (4) Date: Oct. 22, 2008

(87) PCT Pub. No.: WO2007/123204  
PCT Pub. Date: Nov. 1, 2007

(65) Prior Publication Data  
US 2009/0086515 A1    Apr. 2, 2009

(30) Foreign Application Priority Data

Apr. 24, 2006    (JP) ................. 2006-119123

(51) Int. Cl.  
*H02M 1/02*    (2006.01)  
*H02M 5/458*    (2006.01)

(52) U.S. Cl.  
CPC ..................... *H02M 5/4585* (2013.01)

(58) Field of Classification Search  
USPC ........... 363/34–37, 55, 40, 44, 45, 47–50, 52, 363/56.01–56.12, 60–62  
See application file for complete search history.

(56) References Cited

U.S. PATENT DOCUMENTS

| | | | |
|---|---|---|---|
| 4,864,483 A * | 9/1989 | Divan | 363/37 |
| 5,764,496 A * | 6/1998 | Sato et al. | 363/37 |
| 6,995,992 B2 | 2/2006 | Wei et al. | |
| 2005/0099829 A1* | 5/2005 | Wei et al. | 363/34 |
| 2006/0033466 A1 | 2/2006 | Yamada et al. | |
| 2006/0179859 A1* | 8/2006 | Nakata et al. | 62/228.1 |

FOREIGN PATENT DOCUMENTS

| | | |
|---|---|---|
| JP | 2000-341967 A | 12/2000 |
| JP | 2004-343993 A | 12/2004 |
| JP | 2006-054947 A | 2/2006 |

OTHER PUBLICATIONS

Wei et al.; "Investigation of 9-switch Dual-bridge Matrix Converter Opening under Low Output Power Factor"; Department of Electrical and Computer Engineering University of Wisconsin-Madison; WI. 2003.

* cited by examiner

*Primary Examiner* — Adolf Berhane  
*Assistant Examiner* — Henry Lee, III  
(74) *Attorney, Agent, or Firm* — Global IP Counselors

(57) ABSTRACT

Capacitors are connected in series between a first DC link section and a second DC link section when the capacitors are charged by a regenerative current derived from an inverter section. During discharge, as first, second switching circuits turn on, the capacitors are discharged with those capacitors connected in parallel between a first DC link section and a second DC link section.

4 Claims, 10 Drawing Sheets

US 9,065,353 B2

DIRECT AC POWER CONVERTING APPARATUS

CROSS-REFERENCE TO RELATED APPLICATIONS

This U.S. National stage application claims priority under 35 U.S.C. §119(a) to Japanese Patent Application No. 2006-119123, filed in Japan on Apr. 24, 2006, the entire contents of which are hereby incorporated herein by reference.

TECHNICAL FIELD

The present invention relates to direct AC power converting apparatuses and, more particularly, to a direct AC power converting apparatus having a clamp circuit in a DC link part.

BACKGROUND ART

As a typical main circuit construction for inverters, indirect AC power conversion circuits which converts a commercial AC current into a DC current via a rectifier circuit and a smoothing circuit and obtains an AC output by a voltage-type converter are generally used. Meanwhile, as a method for obtaining an AC output directly from an AC voltage, direct AC power converting apparatuses typified by matrix converters are known. In this case, since large capacitors and reactors for smoothing voltage pulsations by commercial frequencies are unnecessary, converter miniaturization can be expected and therefore the direct AC power converting apparatuses have been increasingly gaining attentions as next-generation power converting apparatuses.

Also, as a direct conversion circuit with a DC link, a circuit method and a modulation principle which have no smoothing circuit in the DC link of conventional inverters have been proposed in Document 1 (Lixiang.Weigh, Thomas. A. Lipo, "Investigation of 9-switch Dual-bridge Matrix Converter Operating under Low Output Power Factor", U.S.A., IEEE ISA2003, vol. 1, pp. 176-181), and Document 2 (U.S. Pat. No. 6,995,992). These Documents 1 and 2 disclose that an average current (voltage) of the DC link part is controlled into a pulsating current, a converter-side current is controlled into a trapezoidal waveform, and moreover inverter-side PWM (Pulse Width Modulation) is synchronized with the converter side, thus making it possible to achieve direct conversion from a commercial AC current into an AC output without generating a certain DC voltage.

In such a direct conversion circuit with the DC link, since no regenerative function is provided on the converter side, a clamp circuit of absorbing electric power is necessitated for the DC link part.

In the direct conversion circuit with the DC link part, since one AC capacitor is connected to the DC link part, a √3-time larger voltage is applied to the capacitor used in the input-side LC filter circuit, involving the use of a capacitor having a high withstand voltage. This leads to an increase in cost as a problem.

Further in the direct conversion circuit with the DC link, since the capacitor in the clamp circuit is discharged, an active element and a control circuit are necessitated, resulting in a complicated circuit construction.

DISCLOSURE OF THE INVENTION

Problems to be Solved by the Invention

Accordingly, an object of the present invention is to provide a direct AC power converting apparatus which make it possible to lower the withstand voltage of the capacitor to be used for the clamp circuit with a simple construction.

Solutions to Achieve the Object

In order to achieve the object, a direct AC power converting apparatus according to the present invention comprises:
a converter section for converting a three-phase AC input voltage into a DC voltage;
an inverter section for converting the DC voltage, which is a conversion result by the converter section, into a specified three-phase AC output voltage;
a first DC link section on an anode side and a second DC link section on a cathode side for connecting the converter section and the inverter section to each other; and
a clamp circuit which is connected between the first DC link section and the second DC link section and which has at least two capacitance elements, wherein
in the clamp circuit,
with the capacitance elements connected in series between the first DC link section and the second DC link section, the individual capacitance elements are charged by a regenerative current derived from the inverter section, and
with the individual capacitance elements connected in parallel between the first DC link section and the second DC link section, the capacitance elements are discharged.

It is noted that the term, DC voltage, includes such voltages as AC voltage components are superimposed on DC voltage components.

In this case, with the capacitance elements connected in series between the first DC link section and the second DC link section, the individual capacitance elements are charged by a regenerative current derived from the inverter section. On the other hand, with the capacitance elements connected in parallel between the first DC link section and the second DC link section, the capacitance elements are discharged. In the charging of the capacitance elements by the regenerative current derived from the inverter section, the voltage between the first, second DC link sections is divided while the capacitance elements are connected in series. Therefore, by using such a nonlinear capacitor circuit, the withstand voltage of the capacitors used for the clamp circuit can be lowered with a simple construction.

In a direct AC power converting apparatus in accordance with one aspect of the present invention,
the clamp circuit has:
a first capacitance element having one end connected to the first DC link section;
a second capacitance element having one end connected to the second DC link section;
a diode element connected in forward direction between the other end of the first capacitance element and the other end of the second capacitance element;
a first switching circuit which is connected between a connecting point of the diode element and the second capacitance element and the first DC link section, and which turns on during discharge of the second capacitance element; and
a second switching circuit which is connected between a connecting point of the diode element and the first capacitance element and the second DC link section, and which turns on during discharge of the first capacitance element.

In this direct AC power converting apparatus, since the discharge level can be controlled by the first, second switching circuits, the clamp voltage, which is the charge level, can be controlled.

In a direct AC power converting apparatus in accordance with one aspect of the present invention, the clamp circuit has:

a first capacitance element having one end connected to the first DC link section;

a second capacitance element having one end connected to the second DC link section;

a first diode element connected in forward direction between the other end of the first capacitance element and the other end of the second capacitance element;

a second diode element connected in reverse direction between a connecting point of the first diode element and the second capacitance element and the first DC link section; and a third diode element connected in reverse direction between a connecting point of the first diode element and the first capacitance element and the second DC link section.

In this direct AC power converting apparatus, by applying diodes to the discharge path, it becomes possible to eliminate the need for any active element or control circuit, allowing a passive snubber construction to be adopted.

In a direct AC power converting apparatus in accordance with another aspect of the present invention, the clamp circuit has:

a first capacitance element having one end connected to the first DC link section;

a first diode element having one end connected to the other end of the first capacitance element;

a second capacitance element having one end connected to the other end of the first diode element;

a second diode element having one end connected to the other end of the second capacitance element;

a third capacitance element having one end connected to the other end of the second diode element and having the other end connected to the other end of the second DC link section;

a third diode element connected in reverse direction between a connecting point of the first diode element and the first capacitance element and the second DC link section;

a fourth diode element connected in reverse direction between a connecting point of the first diode element and the second capacitance element and the first DC link section;

a fifth diode element connected in reverse direction between a connecting point of the second diode element and the second capacitance element and the second DC link section; and a sixth diode element connected in reverse direction between a connecting point of the second diode element and the third capacitance element and the first DC link section, and wherein the first diode element is connected in forward direction between the first capacitance element and the second capacitance element, and the second diode element is connected in forward direction between the second capacitance element and the third capacitance element.

In this direct AC power converting apparatus, when the first to third capacitance elements are charged with a regenerative current derived from the inverter section, the voltage between the first, second DC link sections is divided with the capacitance elements connected in series. Thus, the withstand voltage of capacitors to be used for the clamp circuit can be further lowered. Also, the charging voltage becomes about 1.5 times higher than in the case where two capacitors of the clamp circuit are connected in series, while the discharge level is equivalent thereto. As a result, discharge occurs while the power supply voltage (voltage fluctuation of the three-phase AC input voltage) is under a minimum voltage, but charge and discharge do not occur while the power supply voltage is not less than the minimum voltage. Thus, occurrence of losses due to unnecessary charge and discharging can be avoided against voltage fluctuations of the three-phase AC input voltage.

Effects of the Invention

As apparent from the above description, according to the direct AC power converting apparatus of the invention, by virtue of the application of nonlinear capacitor circuits, the capacitor withstand voltage of the clamp circuit can be reduced to a half. Furthermore, application of diodes to the discharge path eliminates the need for any active device or control circuit, allowing a passive snubber construction to be adopted.

DETAILED DESCRIPTION OF THE INVENTION

Hereinbelow, a direct AC power converting apparatus of the present invention will be described in detail by way of embodiments thereof illustrated in the accompanying drawings.

(First Embodiment)

Figure 1:
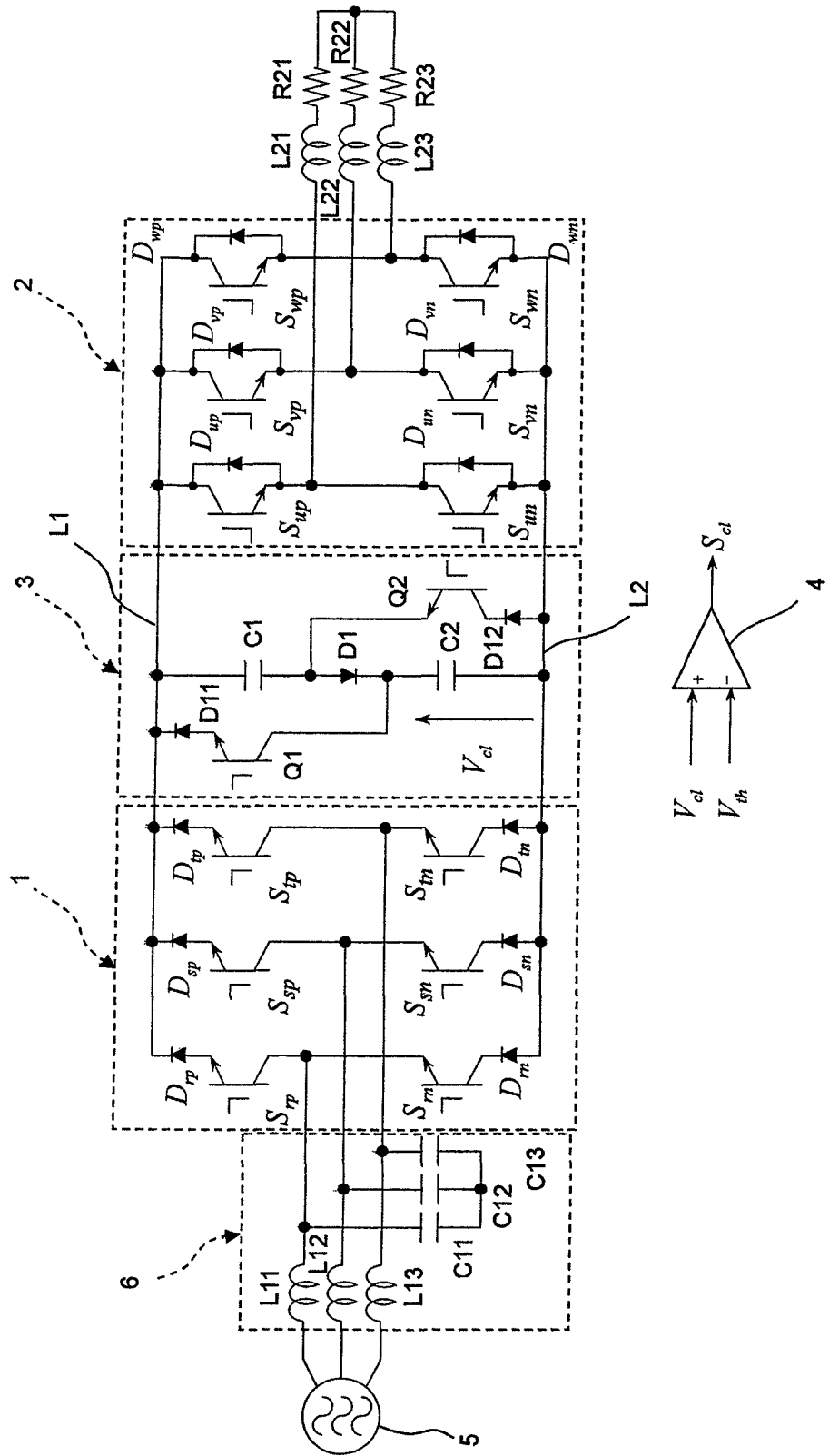
FIG. 1 is a constructional view of a direct AC power converting apparatus according to a first embodiment of the present invention.

FIG. 1 shows a constructional view of a direct AC power converting apparatus according to a first embodiment of the invention.

The direct AC power converting apparatus of this first embodiment, as shown in FIG. 1, includes a converter section 1 composed of transistors $S_{rp}$, $S_{rn}$, $S_{sp}$, $S_{sn}$, $S_{tp}$, $S_{tn}$ and diodes $D_{rp}$, $D_{rn}$, $D_{sp}$, $D_{sn}$, $D_{tp}$, $D_{tn}$, an inverter section 2 composed of transistors $S_{up}$, $S_{un}$, $S_{vp}$, $S_{vn}$, $S_{wp}$, $S_{wn}$ and diodes $D_{up}$, $D_{vp}$, $D_{Vn}$, $D_{wn}$, and a control section (not shown) for outputting control signals to turn on and off the transistors $S_{rp}$, $S_{rn}$, $S_{sp}$, $S_{sn}$, $S_{tp}$, $S_{tn}$ of the converter section 1 and the transistors $S_{up}$, $S_{un}$, $S_{vp}$, $S_{vn}$, $S_{wp}$, $S_{wn}$ of the inverter section 2.

The converter section 1 inputs a phase voltage $v_r$ derived from a three-phase AC power supply 5 to a collector of the transistor $S_{rp}$ and an emitter of the transistor $S_{rn}$ via a coil L11. The converter section 1 also inputs a phase voltage $v_s$ derived from the three-phase AC power supply 5 to a collector of the transistor $S_{sp}$ and an emitter of the transistor $S_{sn}$ via a coil L12. Further, the converter section 1 inputs a phase voltage $v_t$ derived from the three-phase AC power supply 5 to a collector of the transistor $S_{tp}$ and an emitter of the transistor $S_{tn}$ via a coil L13. The emitters of the transistors $S_{rp}$, $S_{sp}$, $S_{tp}$ are connected to anodes of the diodes $D_{rp}$, $D_{sp}$, $D_{tp}$, respectively, cathodes of those diodes $D_{rp}$, $D_{sp}$, $D_{tp}$ are each connected to a first DC link section L1. On the other hand, the collectors of the transistors $S_{rn}$, $S_{sn}$, $S_{tn}$ are connected to cathodes of the diodes $D_{rn}$, $D_{sn}$, $D_{tn}$, respectively, and anodes of those diodes $D_{rn}$, $D_{sn}$, $D_{tn}$ are each connected to a second DC link section L2.

It is noted that one end of a capacitor C11 is connected between the coil L11 and the collector of the transistor $S_{rp}$, one end of the capacitor C12 is connected between the coil L12 and the collector of the transistor $S_{sp}$, and one end of a capacitor C13 is connected between the coil L13 and the collector of the transistor $S_{tp}$. The other ends of the capacitors C11, C12, C13 are connected to one another. The coils L11, L12, L13 and the capacitors C11, C12, C13 make up an LC filter circuit 6.

Also, the inverter section 2 connects the emitter of the transistor $S_{up}$ and the collector of the transistor $S_{un}$ to an output terminal to an output terminal of a phase voltage $v_u$ of a three-phase AC output voltage, connects the emitter of the transistor $S_{vp}$ and the collector of the transistor $S_{vn}$ to an output terminal of a phase voltage $v_v$, and connects the emitter of the transistor $S_{wp}$ and the collector of the transistor $S_{wn}$ to an output terminal of a phase voltage $v_w$. The collectors of the transistors $S_{up}$, $S_{vp}$, $S_{wp}$ are each connected to the first DC link section L1, while the emitters of the transistors $S_{un}$, $S_{vn}$, $S_{wn}$ are each connected to the second DC link section L2. Further, the diodes $D_{up}$, $D_{vp}$, $D_{wp}$ are connected between the collectors and emitters of the transistors $S_{up}$, $S_{vp}$, $S_{wp}$ in reverse directions, respectively, while the diodes $D_{un}$, $D_{vn}$, $D_{wn}$ are connected between the collectors and emitters of the transistors $S_{un}$, $S_{vn}$, $S_{wn}$ in reverse directions, respectively.

Three-phase star-connected loads (coils L21, L22 L23 and resistors R21, R22, R23) are connected to output terminals of the phase voltage $v_u$, $v_v$, $v_w$ of the inverter section 2, respectively.

Also, one end of a capacitor C1 as an example of a first capacitance element is connected to the first DC link section L1, and an anode of a diode D1 as an example of a diode element is connected to the other end of the capacitor C1. One end of a capacitor C2 as an example of a second capacitance element is connected to a cathode of the diode D1, and the other end of the capacitor C2 is connected to the second DC link section L2. Also, a collector of a transistor Q1 is connected to the cathode of the diode D1, and an emitter of the transistor Q1 is connected to an anode of a diode D11. A cathode of the diode D11 is connected to the first DC link section L1. An emitter of a transistor Q2 is connected to the anode of the diode D1, and the collector of the transistor Q1 is connected to a cathode of a diode D12. Then, an anode of the diode D12 is connected to the second DC link section L2. The capacitors C1, C2, the diodes D1, D2, D3, and the transistors Q1, Q2 constitute a clamp circuit 3. The transistor Q1 and the diode D11 constitute a first switching circuit. Also, the transistor Q2 and the diode D12 constitute a second switching circuit.

The direct AC power converting apparatus also includes a differential amplifier 4 to which a voltage Vc1 (voltage across the capacitor C2) is applied at its noninverting input terminal while a reference voltage Vth is applied to its inverting input terminal, so that a control signal Sc1 outputted from the differential amplifier 4 is inputted to bases of the transistors Q1, Q2. The reference voltage Vth is a reference voltage for turning on the transistors Q1, Q2 when discharge of the capacitors C1, C2 is started.

As shown in FIG. 1, since a voltage between the first, second DC link sections L1, L2 is divided by the series-connected two capacitors C1, C2, applied voltages of the capacitors C1, C2 can be reduced to about $\sqrt{3}/2$, as compared with applied voltages of the capacitors C11-C13 of the input-side LC filter circuit 6.

Figure 2:
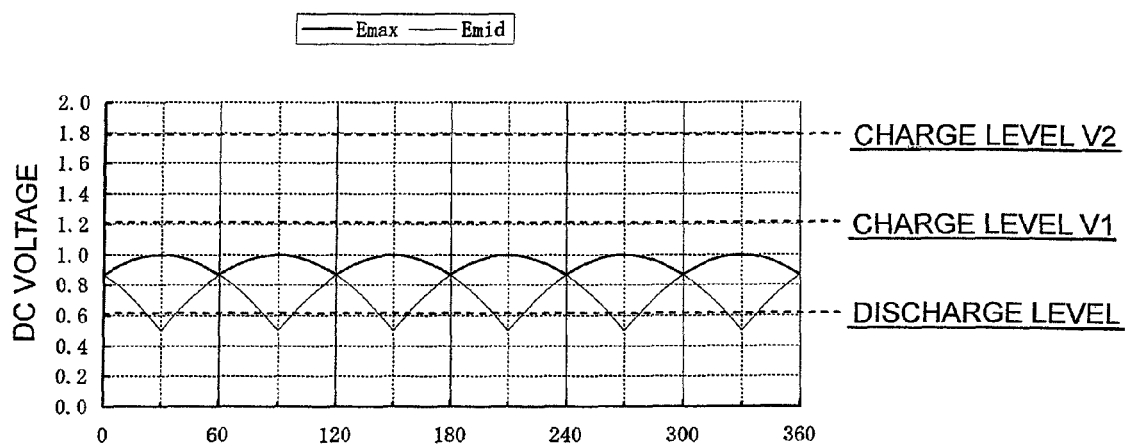
FIG. 2 is a chart showing a DC voltage of the direct AC power converting apparatus.

In the direct AC power converting apparatus of the first embodiment described above, since the discharge level of FIG. 2 can be controlled, it becomes implementable to control the clamp voltage, which is at a charge level V1. In this case, as shown in FIG. 2, taking into consideration that the peak value of a maximum voltage becomes a double of a minimum value of the intermediate voltage in instantaneous values of the DC link voltage, the clamp circuit 3 is employed as a snubber which discharges with a half voltage.

According to the direct AC power converting apparatus constructed as described above, when the capacitors C1, C2 are charged with a regenerative current derived from the inverter section 2, the voltage between the first, second DC link sections L1, L2 is divided with the capacitors C1, C2 connected in series. Thus, the withstand voltage of capacitors to be used for the clamp circuit can be lowered with a simple construction.

Furthermore, since the discharge level can be controlled by the first, second switching circuits (Q1, D11, Q2, D12), it becomes implementable to control the clamp voltage that is the charge level V1.

(Second Embodiment)

Figure 3:
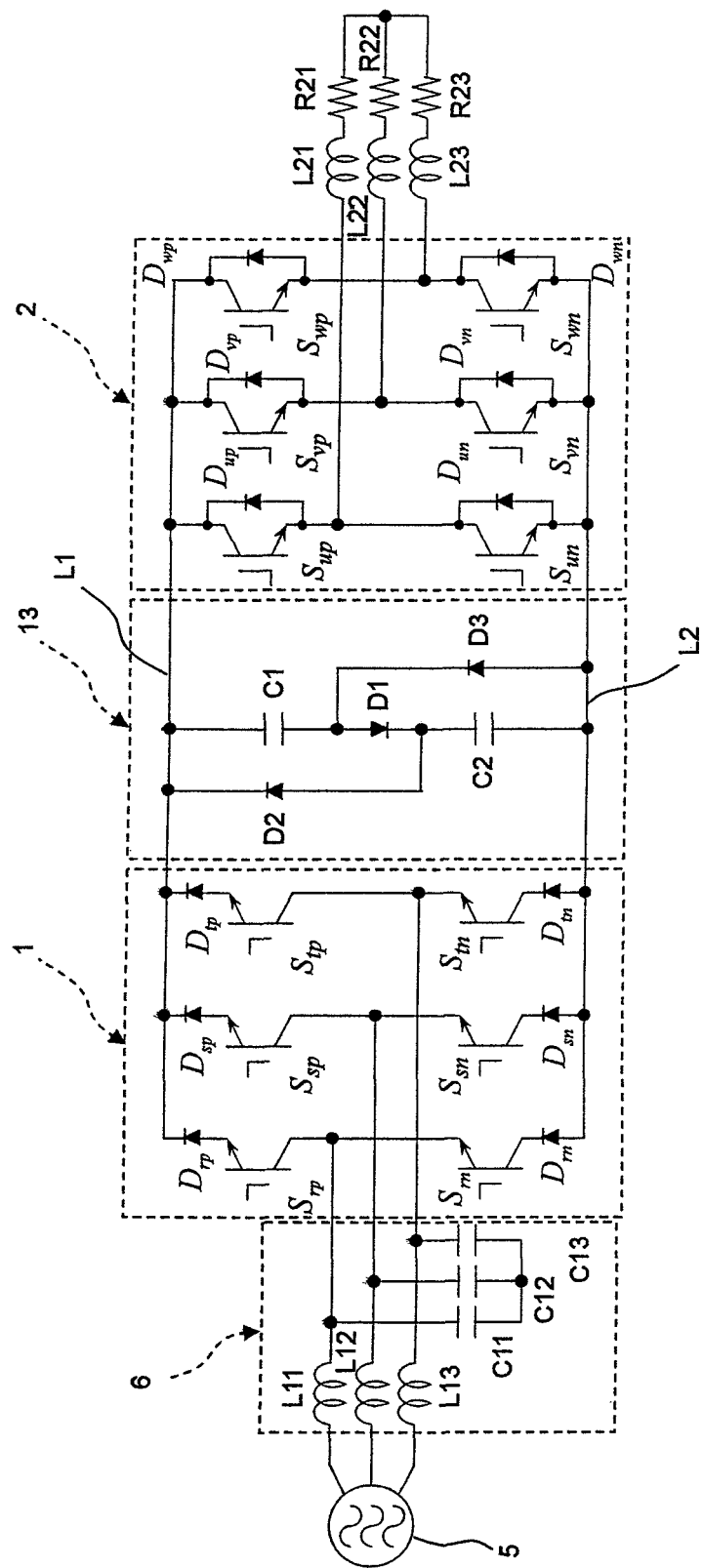
FIG. 3 is a constructional view of a direct AC power converting apparatus according to a second embodiment of the present invention.

FIG. 3 shows a constructional view of a direct AC power converting apparatus according to a second embodiment of the invention. The direct AC power converting apparatus of this second embodiment is similar in construction to the direct AC power converting apparatus of the first embodiment except the clamp circuit. Therefore, like constituent members are designated by like reference numerals, and their description is omitted.

One end of a capacitor C1 as an example of a first capacitance element is connected to the first DC link section L1, and an anode of a diode D1 as an example of a first diode element is connected to the other end of the capacitor C1. One end of a capacitor C2 as an example of a second capacitance element is connected to a cathode of the diode D1, and the other end of the capacitor C2 is connected to the second DC link section L2. Also, an anode of a diode D2 as an example of a second diode element is connected to the cathode of the diode D1, and a cathode of the diode D2 is connected to the first DC link section L1. Then, a cathode of a diode D3 as an example of a third diode element is connected to the anode of the diode D1, and an anode of the diode D3 is connected to the second DC link section L2. The capacitors C1, C2 and the diodes D1, D2, D3 constitute a clamp circuit 13.

In the direct AC power converting apparatus of the second embodiment described above, since the discharge level of FIG. 2 is determined by a period required for discharge, the charge level exceeds the peak value of the maximum voltage, but the capacitor voltage acts to obtain equilibrium because the period for action as an intermediate voltage during discharge is prolonged by voltage increase during charge.

Figure 9:
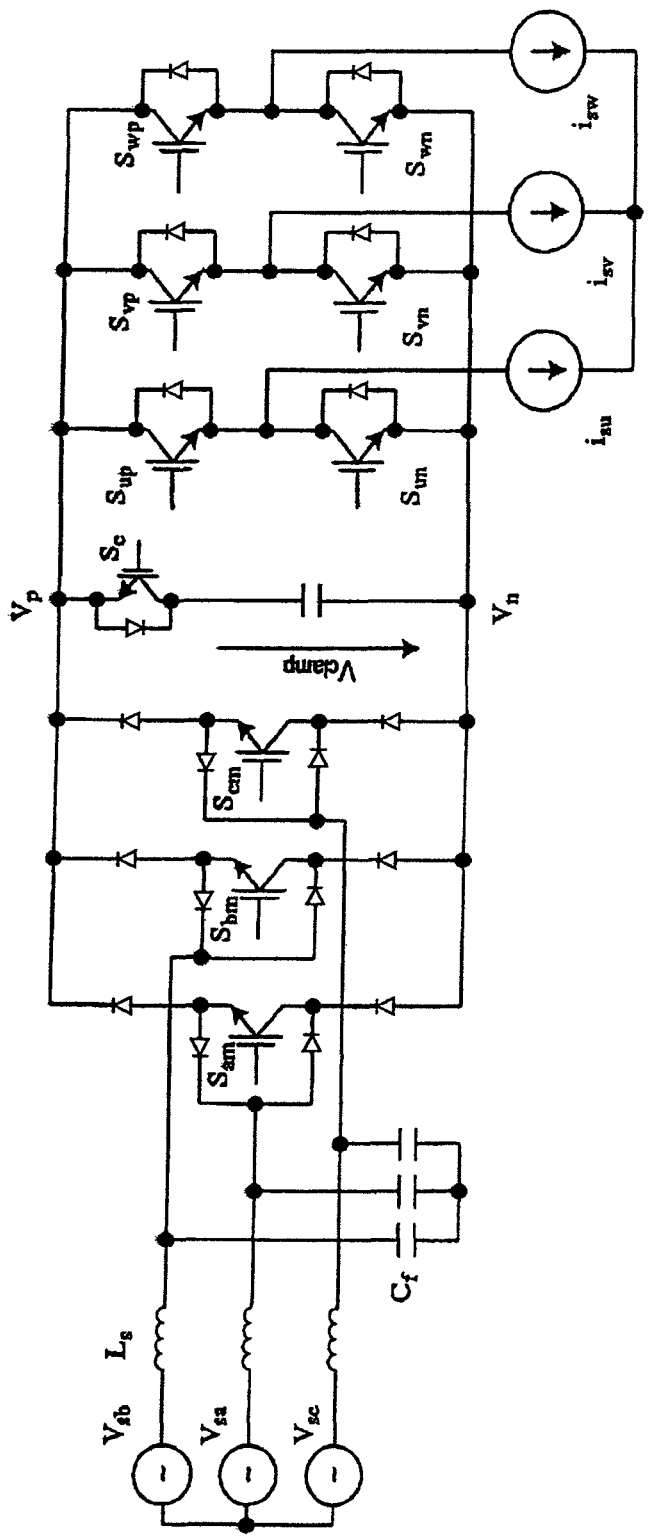
FIG. 9 is a constructional view of a direct AC power converting apparatus according to a prior art.
Figure 10:
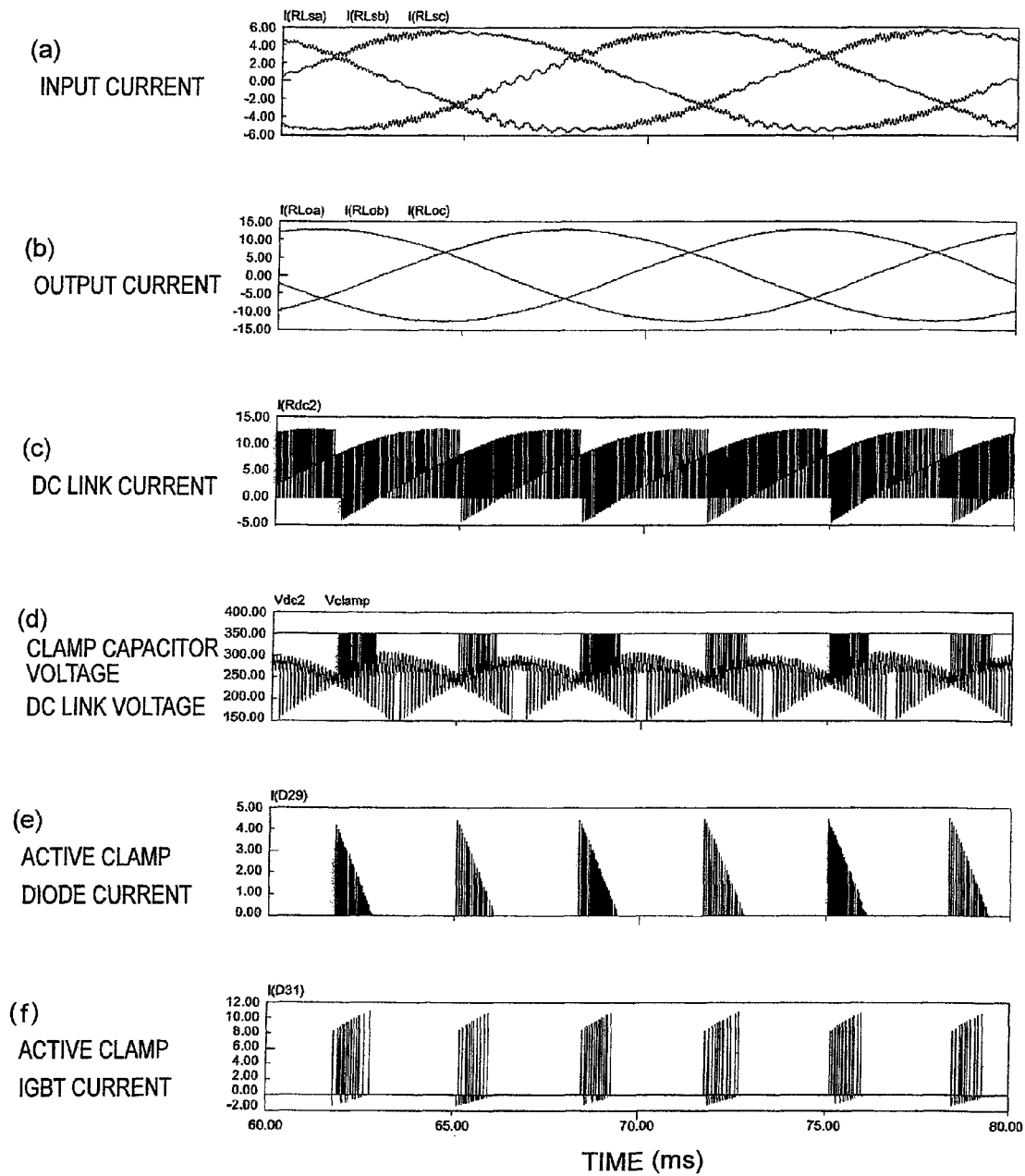
FIG. 10 includes charts showing simulation results of the direct AC power converting apparatus.

FIG. 9 shows a construction of a direct AC power converting apparatus according to a prior art method for comparison' sake. In FIG. 9, reference numerals $S_{am}$, $S_{bm}$, $S_{cm}$ denote converter-side transistors, $S_{up}$, $S_{vp}$, $S_{wp}$, $S_{un}$, $S_{vn}$, $S_{wn}$ denote inverter-side transistors, and Sc denotes a transistor of the clamp circuit. Also, FIG. 10 shows simulation results under a delay power factor load of 0.62 (51.5°) on the direct AC power converting apparatus shown in FIG. 9. FIG. 10(a) shows an input current, FIG. 10(b) shows an output current, FIG. 10(c) shows a DC link current, FIG. 10(d) shows a clamp capacitor voltage and a DC link voltage, FIG. 10(e) shows an active clamp diode current, and FIG. 10(f) shows an active clamp IGBT (Insulated-Gate Bipolar Transistor) current.

Figure 4:
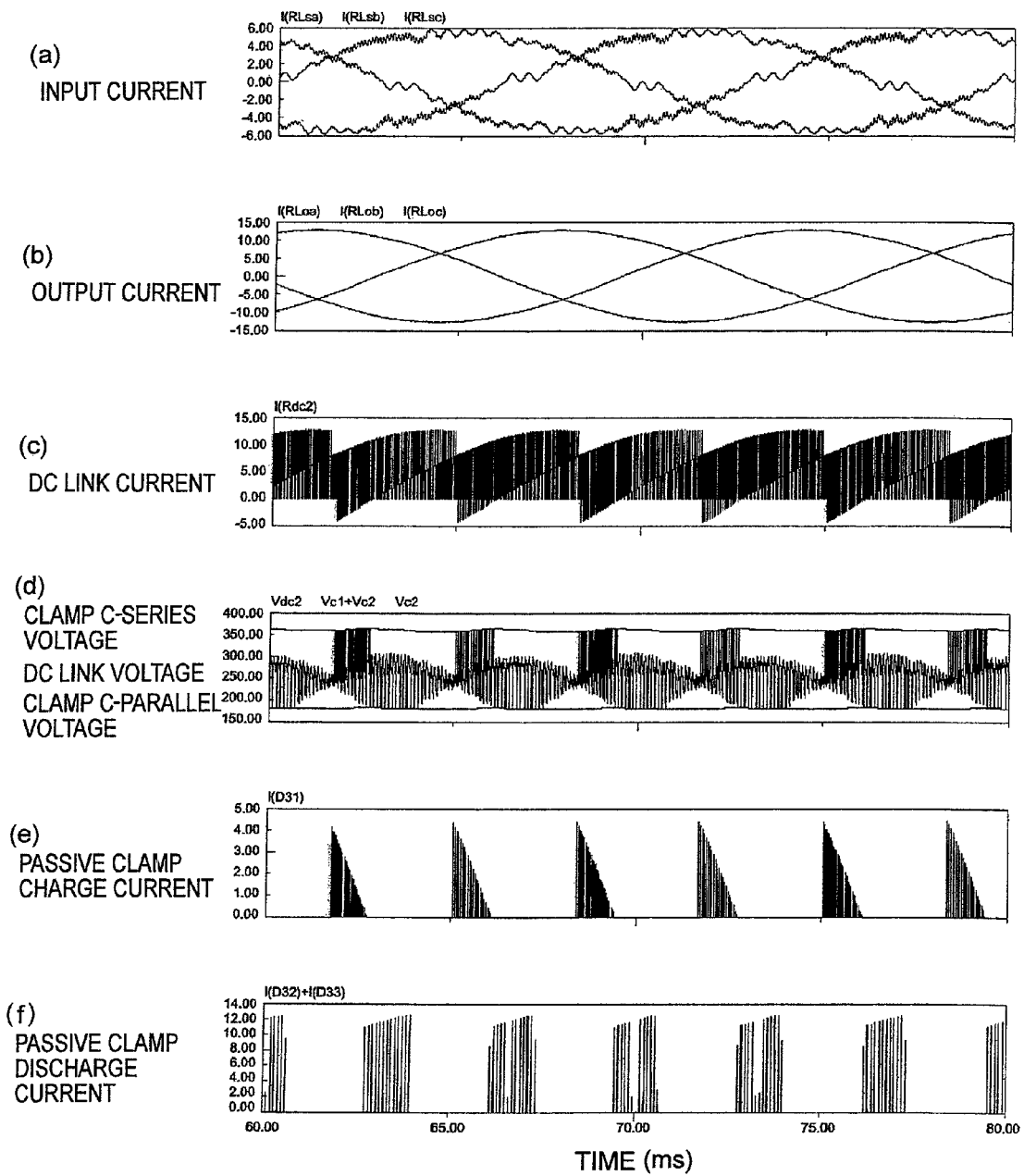
FIG. 4 includes charts showing simulation results of the direct AC power converting apparatus.

Also, FIG. 4 shows simulation results under a delay power factor load of 0.62 (51.5°) on the direct AC power converting apparatus of this second embodiment. FIG. 4(a) shows an input current, FIG. 4(b) shows an output current, FIG. 4(c) shows a DC link current, FIG. 4(d) shows a clamp C-series voltage, a DC link voltage and a clamp C-parallel voltage, FIG. 4(e) shows a passive clamp charge current, and FIG. 4(f) shows a passive clamp discharge current.

In the prior-art direct AC power converting apparatus shown in FIG. 9, because of clamping at a threshold voltage of 350 V, charging and discharging at the clamp voltage are repeated. In the second embodiment, on the other hand, since the discharge voltage is determined by the period during which the intermediate voltage keeps at a minimum, a clamp voltage double the discharge voltage can be obtained, so that a constant-voltage clamp operation can be realized with no control.

Above-mentioned Document 1 ("Investigation of 9-switch Dual-bridge Matrix Converter Operating under Low Output Power Factor") shows that a current is regenerated to the DC link section in regions where the phase angle of an output current is not less than π/6.

An explanation of the relationship between regeneration period and clamp voltage will be given below.

Figure 5:
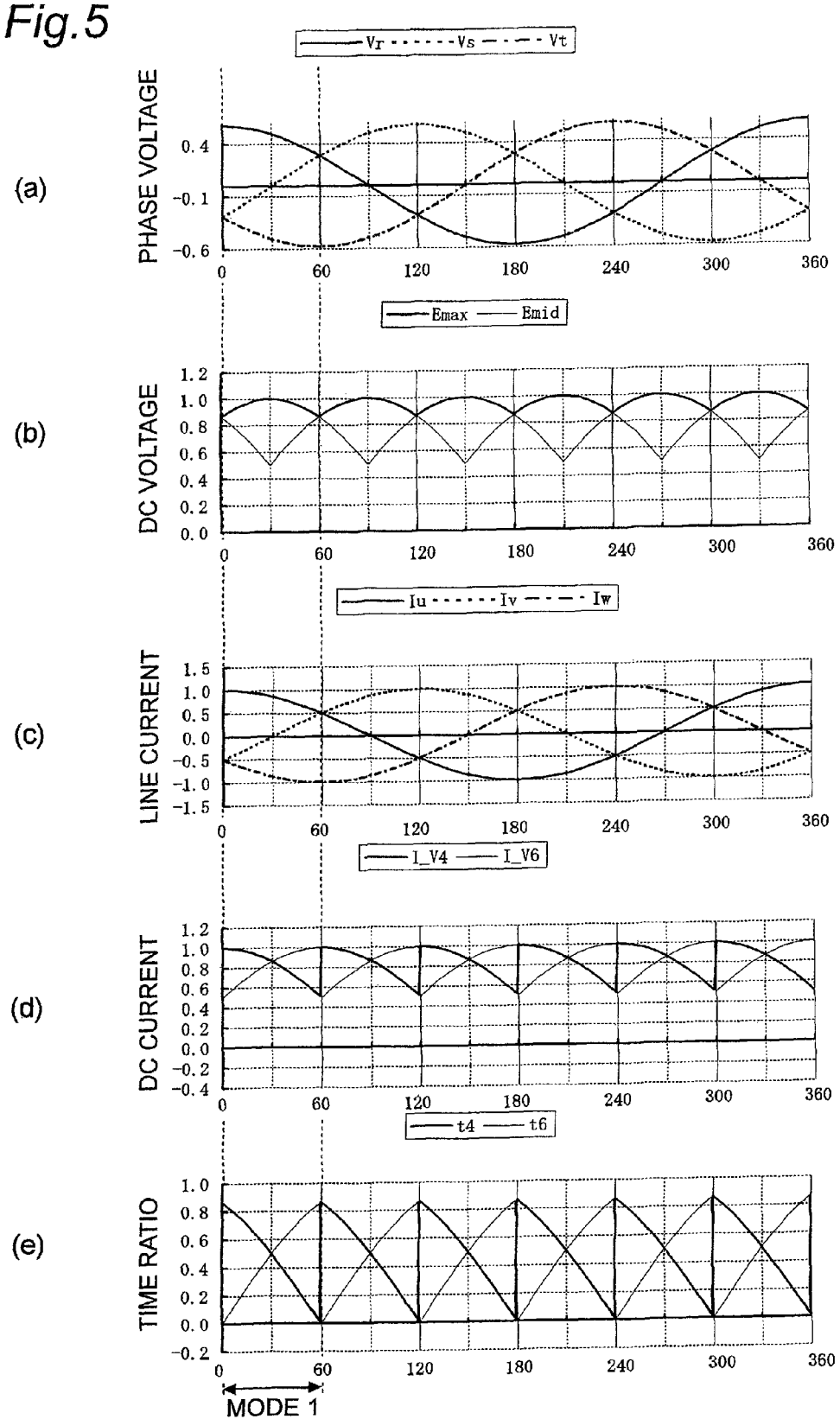
FIG. 5 includes charts showing relationships between input current and DC current by waveforms of individual sections with respect to a regenerative state under a power factor of 1 of the direct AC power converting apparatus.

FIGS. 5(a) to 5(e) show a relationship between input current and DC current by waveforms of the individual sections with respect to a regenerative state under a power factor of 1 of the direct AC power converting apparatus of the second embodiment. FIGS. 6(a) to 6(e) show a relationship between input current and DC current by waveforms of the individual sections with respect to a regenerative state under a delay of π/4 and a power factor of 0.7. It is noted that FIG. 5(a) and FIG. 6(a) show inputted phase voltage waveforms, FIG. 5(b) and FIG. 6(b) show DC voltages, FIG. 5(c) and FIG. 6(c) show line currents, FIG. 5(d) and FIG. 6(d) show DC currents, and FIG. 5(e) and FIG. 6(e) show time ratios $t_4$, $t_6$, respectively.

In the DC link sections (first, second DC link sections L1, L2), two-phase line currents flow therethrough by selected two vectors. In a mode 1 in FIG. 5, it can be understood that since an upper arm ($S_{up}$) of the U phase in the inverter section 2 turns ON during a period $V_4$, a line current Iu flows through the DC link sections, causing a lower arm ($S_{wn}$) of the W phase in the inverter section 2 to turn ON during a period $V_6$, so that a line current −Iw flows through the DC link section (see FIG. 5(c)). It can also be read from the waveforms that the DC link voltage keeps a positive value for up to a delay phase of π/6 (see FIG. 5(c)).

Meanwhile, FIGS. 6(a) to 6(e) shows a case of a delay of π/4 (power factor of 0.7) of the direct AC power converting apparatus of the second embodiment. In this case, the current during a π/12 period in the period $V_6$ becomes negative, and a charge current flows into the clamp circuit 13 only in that region (see FIG. 6(c), FIG. 6(d)).

Under such circumstances, the capacitors C1, C2 of the clamp circuit 13 hold a constant voltage double the discharge voltage, and discharges at the time when the DC link voltage becomes an intermediate voltage Emid through switching of the converter section 1. It is noted that the voltage to be held comes to an equilibrium by balancing between discharge phase and load phase on the inverter section 2 side.

Figure 6:
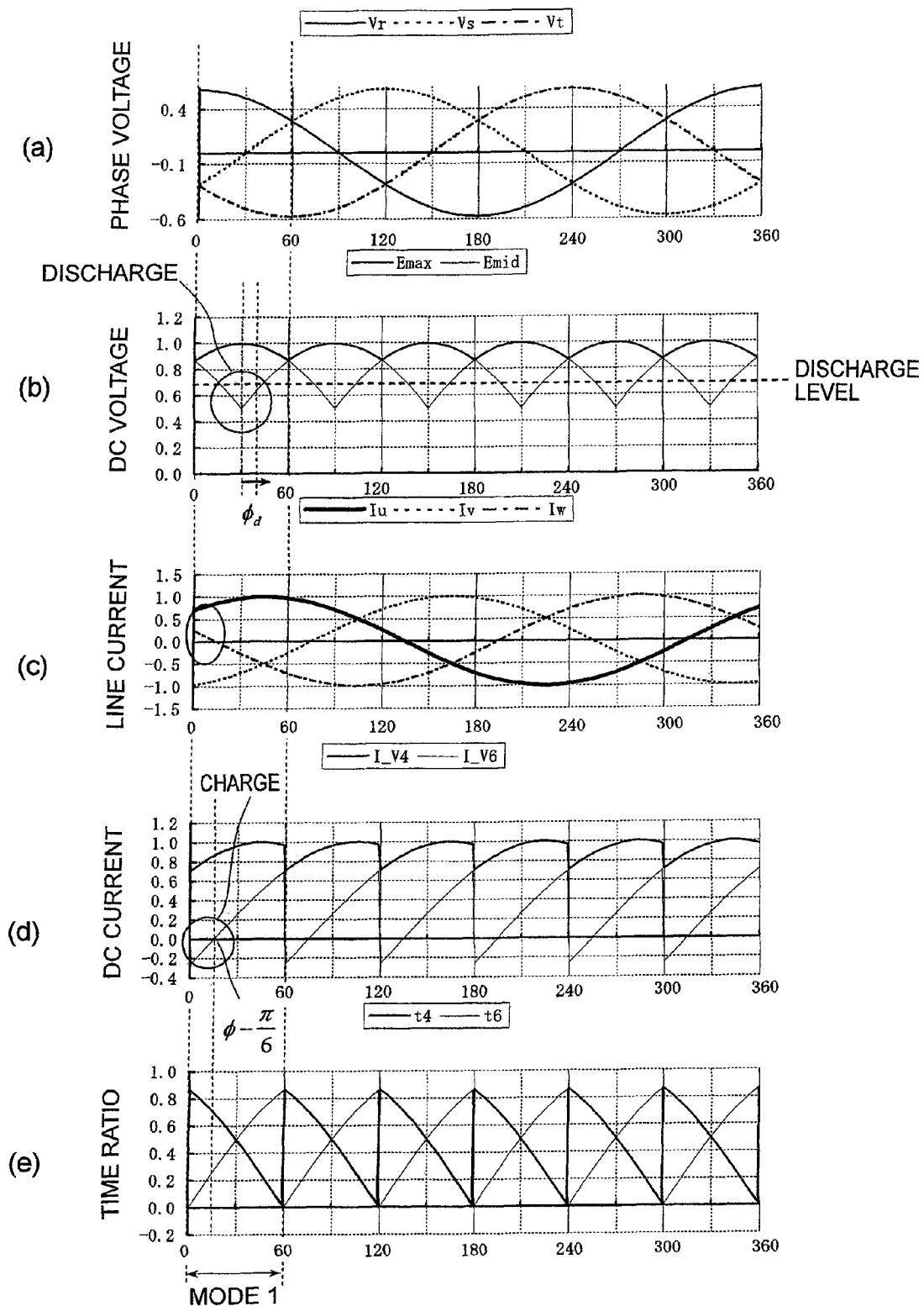
FIG. 6 includes charts showing relationships between input current and DC current by waveforms of individual sections with respect to a regenerative state under a power factor of 0.7 of the direct AC power converting apparatus.

With regard to electric charge in charging in FIG. 6, in which PWM modulation is applied at the time ratios $t_4$, $t_6$ shown in FIG. 6(e), the average current can be determined by multiplying the current value (FIG. 6(d)) and the time ratio (FIG. 6(e)) together.

In a DC current $I_{v6}$ appearing during a period $t_6$, in which a W-phase current appears as it is inverted, and given a current delay phase angle (power factor angle) φ, the DC current $I_{v6}$ results in:

$$I_{v6} = \cos\left(\theta + \frac{2\pi}{3} - \phi\right)$$
$$= -\sin\left(\theta + \frac{2\pi}{3} + \frac{\pi}{2} - \phi\right)$$
$$= \sin\left(\theta + \frac{\pi}{6} - \phi\right)$$

Now, if the sine wave is considered by linear approximation because of a small delay phase angle, then the current value and the time ratio can be expressed by the following equation:

$$I_{v6} = \frac{3}{\pi}\left(\theta - \left(\phi - \frac{\pi}{6}\right)\right), \quad t_6 = \frac{3}{\pi}\theta$$

Therefore, the average current $I_{v6}t_6$ is $$I_{v6}t_6 = \frac{9}{\pi^2}\left(\theta^2 - \left(\phi - \frac{\pi}{6}\right)\theta\right)$$

and the charge $q_c$ for charging can be determined by integrating the average current $I_{v6}t_6$:

$$q_c = \int_0^{\phi - \pi/16} I_{v6}t_6 \, d\theta = -\frac{3\left(\phi - \frac{\pi}{6}\right)^3}{2\pi^2}$$

Meanwhile, with respect to charge for discharging, the capacitors C1, C2 of the clamp circuit 13 release charge during the period of connection to the intermediate voltage, i.e., during a period (S-phase current in mode 1) in which the input current is in the intermediate phase because of control with an input power factor of 1. Thus, it is enough to determine the relationship between discharge phase and charge.

Similarly, determining the relationship between discharge phase and charge by linear approximation results in $$q_d = 2\int_0^{\phi_d} I_u \, d\theta = \frac{3}{\pi}\phi_d^2$$

Then, by determining the discharge phase so that the charge $q_c$ for charging and the charge $q_d$ for discharging become equal to each other, the discharge voltage level can be determined.

The relationship between the charge for charging and the charge for discharging varies between the load power factor and the output voltage control factor $k_s$, and therefore is corrected by the following equation:

$$q_c = q_d k_s \cos\phi$$

Also, the relationship between resulting discharge phase and voltage level is, from the DC link waveform, as follows:

$$V_{low} = \sin(\phi_d + \pi/6), V_{high} = 2V_{low}$$

Figure 7:
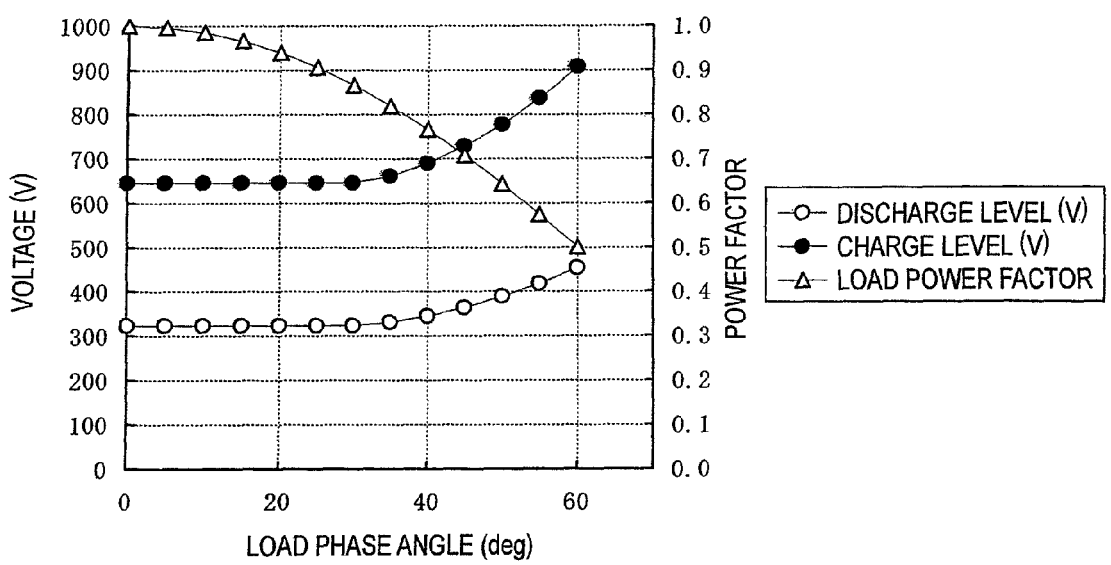
FIG. 7 is a chart showing a result of determining a relationship between load power factor and voltage level of the direct AC power converting apparatus.

A result of the relationship between load power factor and voltage level determined according to the above relational equation is shown in FIG. 7. FIG. 7 gives variations of discharge level, charge level and load power factor in relation to a load phase angle obtained with an input of a 200 V three-phase AC input voltage. In FIG. 7, white circle marks denote discharge level (V), black circle marks denote charge level (V), and triangle marks denote load power factors.

As shown in FIG. 7, the more the load phase angle increases, the more the load power factor decreases while the discharge level and the charge level increase.

As described above, the charge for charging is determined by the load power factor, and the discharge level is uniquely determined by the charge for charging. Therefore, it can be understood that in this method, the clamp voltage is balanced even with the use of passive circuits.

According to the direct AC power converting apparatus constructed described above, when the capacitors C1, C2 are charged with a regenerative current derived from the inverter section 2, the voltage between the first, second DC link sections L1, L2 is divided with the capacitors C1, C2 connected in series. Thus, the withstand voltage of capacitors to be used for the clamp circuit can be lowered with a simple construction.

Also, by applying diodes to the discharge path can eliminate the need for any active element or control circuit, a passive snubber construction can be adopted.

(Third Embodiment)

Figure 8:
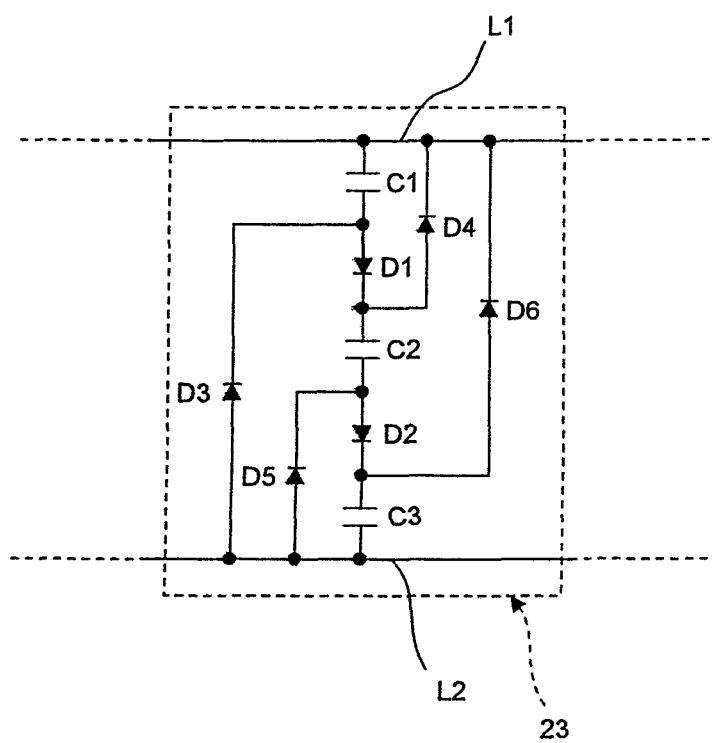
FIG. 8 is a constructional view of a clamp circuit of a direct AC power converting apparatus according to a third embodiment of the invention.

FIG. 8 is a constructional view of a clamp circuit in a direct AC power converting apparatus according to a third embodiment of the invention. The direct AC power converting apparatus of this third embodiment is similar in construction to the direct AC power converting apparatus of the first embodiment except the clamp circuit. Therefore, like constituent members are designated by like reference numerals, with their description omitted, and FIG. 1 is used also in this case.

One end of a capacitor C1 as an example of a first capacitance element is connected to the first DC link section L1, and an anode of a diode D1 as an example of a first diode element is connected to the other end of the capacitor C1. One end of a capacitor C2 as an example of a second capacitance element is connected to a cathode of the diode D1, and the other end of the capacitor C2 is connected to an anode of a diode D2 as an example of a second diode element. Further, a cathode of the diode D2 is connected to one end of a capacitor C3 as an example of a third capacitance element, and the other end of the capacitor C3 is connected to the second DC link section L2. Also, a cathode of a diode D3 as an example of a third diode element is connected to an anode of the diode D1, and an anode of the diode D3 is connected to the second DC link section L2. An anode of a diode D4 as an example of a fourth diode element is connected to the cathode of the diode D1, and a cathode of the diode D4 is connected to the first DC link section L1. Also, a cathode of a diode D5 as an example of a fifth diode element is connected to the anode of the diode D2, and an anode of the diode D5 is connected to the second DC link section L2. Further, an anode of a diode D6 as an example of a sixth diode element is connected to the cathode of the diode D2, and an anode of the diode D6 is connected to the first DC link section L1. The capacitors C1-C3 and the diodes D1-D6 constitute a clamp circuit 23.

The direct AC power converting apparatus of this third embodiment has the same effects as those of the direct AC power converting apparatus of the second embodiment, and moreover the withstand voltage of the capacitors C1-C3 used for the clamp circuit 23 can be further lowered. Also, as shown in FIG. 2, the charge level V2 in this third embodiment becomes about 1.5 times higher than the charge level V1 of the case where two capacitors of the clamp circuit are connected in series, while the discharge level is equivalent between those embodiments. As a result, discharge occurs while the power supply voltage (voltage fluctuation of the three-phase AC input voltage) is under a minimum voltage, but charge and discharge do not occur while the power supply voltage is not less than the minimum voltage. Thus, occurrence of losses due to unnecessary charge and discharging can be avoided against voltage fluctuations of the three-phase AC input voltage.

Direct AC power converting apparatuses including the converter section 1 and the inverter section 2 have been described in the foregoing first to third embodiments. However, the circuit construction of the converter section and the inverter section is not limited to them. The invention may also be applied to direct AC power converting apparatuses including a converter section for converting a three-phase AC input voltage into a DC voltage, an inverter section for converting the DC voltage, which is a conversion result by the converter section, into a specified three-phase AC output voltage, the direct AC power converting apparatuses having no smoothing-use filter in the DC link section that connects the converter section and the inverter section to each other.

What is claimed is:

1. A direct AC power converting apparatus comprising:
   a converter section configured to convert a three-phase AC input voltage into a DC voltage that includes AC voltage components superimposed on DC voltage components;
   an inverter section configured to convert the DC voltage from the converter section into a specified three-phase AC output voltage;
   a first DC link section on an anode side and a second DC link section on a cathode side that are configured to connect the converter section and the inverter section to each other; and
   a clamp circuit connected between the first DC link section and the second DC link section, the clamp circuit having at least two capacitance elements, wherein the AC input voltage is converted into the AC output voltage by the converter section and the inverter section without generating any smoothed DC voltage,
   a first period when the capacitance elements are charged by a regenerative current derived from the inverter section and a second period when the capacitance elements are discharged are sequentially repeated, and
   in the clamp circuit,
      the capacitance elements are connected in series between the first DC link section and the second DC link section when the capacitance elements are charged by a regenerative current derived from the inverter section, and
      the capacitance elements are connected in parallel between the first DC link section and the second DC link section when the capacitance elements are discharged.

2. The direct AC power converting apparatus as claimed in claim 1. wherein
   the clamp circuit includes a first capacitance element having one end connected to the first DC link section;
a second capacitance element having one end connected to the second DC link section;
a diode element connected in forward direction between another end of the first capacitance element and another end of the second capacitance element;
a first switching circuit connected between a connecting point of the diode element and the second capacitance element and the first DC link section, the first switching circuit turning on during discharge of the second capacitance element; and
a second switching circuit connected between a connecting point of the diode element and the first capacitance element and the second DC link section, the second switching circuit turning on during discharge of the first capacitance element.

3. The direct AC power converting apparatus as claimed in claim 1, wherein
the clamp circuit includes
a first capacitance element having one end connected to the first DC link section;
a second capacitance element having one end connected to the second DC link section;
a first diode element connected in forward direction between another end of le first capacitance element and another end of the second capacitance element;
a second diode element connected in reverse direction between a connecting point of the first diode element and the second capacitance element and the first DC link section; and
a third diode element connected in reverse direction between a connecting point of the first diode element and the first capacitance element and the second DC link section.

4. The direct AC power converting apparatus as claimed in claim 1, wherein
the clamp circuit includes
a first capacitance element having one end connected to the first DC link section;
a first diode element having one end connected to another end of the first capacitance element;
a second capacitance element having one end connected to another end of the first diode element;
a second diode element having one end connected to another end of the second capacitance element;
a third capacitance element having one end connected to another end of the second diode element and having another end connected to the second DC link section;
a third diode element connected in reverse direction between a connecting point of the first diode element and the first capacitance element and the second DC link section;
a fourth diode element connected in reverse direction between a connecting point of the first diode element and the second capacitance element and the first DC link section;
a fifth diode element connected in reverse direction between a connecting point of the second diode element and the second capacitance element and the second DC link section;
and
a sixth diode element connected in reverse direction between a connecting point of the second diode element and the third capacitance element and the first DC link section, wherein
the first diode element is connected in forward direction between the first capacitance element and the second capacitance element, and
the second diode element is connected in forward direction between the second capacitance element and the third capacitance element.

* * * * *